US008236076B2

(12) United States Patent
Grieve (10) Patent No.: US 8,236,076 B2
(45) Date of Patent: Aug. 7, 2012

(54) PORTABLE APPARATUS FOR CLEANING AIR FILTERS

(76) Inventor: Dennis Grieve, Tendoy, ID (US)

(*) Notice: Subject to any disclaimer, the term of this patent is extended or adjusted under 35 U.S.C. 154(b) by 216 days.

(21) Appl. No.: 12/884,815

(22) Filed: Sep. 17, 2010

(65) Prior Publication Data

US 2011/0005176 A1    Jan. 13, 2011

Related U.S. Application Data (63) Continuation-in-part of application No. 11/978,304, filed on Oct. 29, 2007, now Pat. No. 7,815,701.

(60) Provisional application No. 60/946,711, filed on Jun. 27, 2007.

(51) Int. Cl.
*B01D 46/04* (2006.01)

(52) U.S. Cl. ............ 55/294; 55/302; 55/295; 55/296; 55/297; 55/298; 55/293; 55/300; 55/303; 95/278; 95/279; 95/280; 15/304; 15/321; 15/352; 210/391; 210/393; 210/394

(58) Field of Classification Search ............. 55/294, 55/302, 295, 296, 297, 298, 293, 300, 303; 95/278, 279, 280; 15/304, 321, 352; 210/391, 210/393, 394
See application file for complete search history.

(56) References Cited

U.S. PATENT DOCUMENTS

| 4,377,401 | A | * | 3/1983 | Laughlin | 55/290 |
|---|---|---|---|---|---|
| 4,802,983 | A | * | 2/1989 | Howeth | 55/302 |
| 4,810,270 | A | * | 3/1989 | Terry et al. | 55/294 |
| 4,826,512 | A | * | 5/1989 | Fuller | 55/283 |
| 5,565,012 | A | * | 10/1996 | Buodd | 55/294 |
| 5,584,900 | A | * | 12/1996 | Zaiser et al. | 55/293 |
| 6,280,491 | B1 | * | 8/2001 | Oke | 55/300 |
| 6,283,305 | B1 | * | 9/2001 | Maeda et al. | 210/356 |
| 6,368,390 | B1 | * | 4/2002 | Bitner et al. | 95/277 |

* cited by examiner

*Primary Examiner* — Duane Smith
*Assistant Examiner* — Minh-Chau Pham
(74) *Attorney, Agent, or Firm* — James Ray & Assoc.

(57) ABSTRACT

An apparatus for cleaning an air filter includes a body, a closed chamber formed within the body, a fluid dispersing member having a portion thereof mounted for rotation within the body and passing through the chamber, a plurality of orifices formed through the wall of the fluid dispersing member and an arrangement for rotating the fluid dispersing member. The arrangement either includes a combination of nozzles secured to the fluid dispersing member and positioned within the chamber and an irregular inner wall surface of the chamber capable of providing resistance to a fluid flow discharged into the chamber or fins disposed on the fluid dispersing member and a passageway through the body for directing fluid under pressure onto the fins. Fluid supplied under pressure to the fluid dispersing member exits through the plurality of orifices toward an inner surface of a air filter filtering medium causing contaminants to exit therefrom.

19 Claims, 8 Drawing Sheets

PORTABLE APPARATUS FOR CLEANING AIR FILTERS

CROSS-REFERENCE TO RELATED APPLICATIONS

This application is a Continuation-In-Part of U.S. patent application Ser. No. 11/978,304 filed Oct. 29, 2007, now U.S. Pat. No. 7,815,701 B.

FIELD OF THE INVENTION

The present invention relates, in general, to air filter cleaning devices and, more particularly, this invention relates to a portable apparatus for cleaning, by way of compressed air, air filters which are used in internal combustion engines on heavy off-road and over the road vehicles.

BACKGROUND OF THE INVENTION

As is generally well known, air filters are used extensively to prevent particulate impurities such as dust and dirt from entering into the combustion chambers of engines. A typical air filter is annular in construction and has a filtering medium which is incorporated into the cylindrical side wall and which allows for passage of air but traps the particulates on its outer surface. When the particulate build-up becomes significant, the air flow through the filtering medium is restricted causing abnormal operation of the combustion engine that increases operating costs and may potentially result in engine failure.

On passenger-type vehicles, it takes a relatively long period of time for the air filter to accumulate significant amount of particulate which will restrict air flow and, therefore, these air filters are replaced infrequently.

On heavy off-road and over the road vehicles, it is common for air filters to accumulate undesirable amount of particulate in a matter of days. Thus, these air filters need frequent attention to maintain the required air flow. However, air filter replacement is usually prohibitive due to cost of the new air filter requiring the operators of such vehicles to periodically clean air filters. One cleaning method is to repeatedly strike the air filter against a rigid structure to dislodge the particulate. However, it has been found that such method does not remove all accumulated particulate. Another method involves use of an air hose with the nozzle inserted into the inner aperture or cavity of the air filter. However, the air is discharged through the nozzle at higher than desirable pressure capable of damaging the filtering medium and requires greater than desirable effort and concentration by the operator to adequately clean the air filter without damaging filtering medium.

Prior to the present invention, efforts have been made to alleviate difficulties in cleaning air filters.

U.S. Pat. No. 5,078,763 issued to Blount-Gillette discloses one type of a portable air filter cleaning device that includes a bottom plate member having a flat upper surface, an apertured vertical column connected to a high pressure air hose and fixed to the bottom member, and a top plate member, removable from the vertical column, having a flat bottom surface, where an annular filter is placed around the vertical column and top plate member is placed onto the vertical column, sealing the filter between the top plate member and the bottom plate member. Air is then forced into the vertical column, exiting through the apertures and through the filter itself, forcing any accumulated particles off the surface of the filter. The disadvantage of this prior art device is in that the vertical column has a fixed length which is not adequate to properly clean all air filters presently in use.

U.S. Pat. No. 3,958,298 issued to Fell discloses another type of the portable filter cleaning device that includes a housing and an upper member. The air filter to be cleaned is inserted between the housing and the upper member. The upper member is provided with a vertically depending rotatable pipe means provided with radially directed nozzles. The pipe means is also provided with a pair of nozzles directed at an angle to the radial to provide a rotary movement to the pipe means. The air filter cleaner may be operated from air compressors readily available on the job site, such as compressors on the heavy construction equipment itself. However, it has been found that rotational speed of the pipe means is dependent on the inner diameter of the air filters with air filters having smaller diameter being cleaned better than air filters having larger diameter. Furthermore, the prior art device of Fell is disadvantaged by the fixed length of the pipe means.

In U.S. Pat. No. 6,588,057, McMahon discloses yet another type of the portable air filter cleaning device that includes en elongated, readily gripable handle having a through bore and a connector at one end for coupling to an air supply hose, and a rotary head is rotatably mounted on the other end of the handle. The rotary head has an internal air distribution chamber with small outlet openings in its outer peripheral wall for spraying air from the chamber. Rotor outlet passageways in the peripheral wall are arranged at an angle to cause the head to spin in a turbine-like fashion when air flow is directed from the chamber and out through the passageways. The rotating head sprays air outwardly across the surface of an air filter unit to dislodge dirt from filter paper in a filter unit. McMahon overcomes the disadvantage of the fixed length member of Blount-Gillette and Fell in that the head is manually moveable along the entire length of the air filter, however, greater then desirable effort is required to clean each air filter due to the axial movement of the rotary head. Another disadvantage of this prior art device is in that the operator is burdened by the responsibility to control the pressure applied by the rotating head onto the filtering medium. Yet another disadvantage of this prior art air filter cleaning device is that the ends of the air filter are not sealed during cleaning process thus wasting the supplied air pressure and increasing the time required to clean the filter.

Therefore, there is a need for an improved portable apparatus for equally cleaning air filters of various lengths and diameters and for controlling the amount of air pressure applied to the inner surface of the filtering medium.

SUMMARY OF THE INVENTION

According to one aspect, the invention provides an apparatus for cleaning air filters. The apparatus includes a body having each of a first end, an opposed second end and an exterior peripheral surface. There is a generally closed chamber that is formed within the body along longitudinal axis thereof. An elongated member is positioned along the longitudinal axis of the body and passes through the chamber. The elongated member has each of a first end thereof mounted for rotation between the first end of the body and the chamber, an opposed second end thereof extending outwardly from the second end of the body and a longitudinal bore formed through the elongated member. There is also plurality of fins disposed within the chamber and radially spaced apart about the longitudinal axis. Each of the plurality of fins has a first edge thereof secured on an exterior surface of the elongated member and having an opposed second edge thereof aligned generally parallel with the longitudinal axis, so that plurality of fins rotate with the elongated member. A first fluid communication means is secured to the first end of the body in fluid communication with the longitudinal bore of the elongated member. The first fluid communication means is connectable to a source of fluid under pressure for supplying a first portion of the fluid under pressure into the longitudinal bore. A second fluid communication means is disposed within the body and has a first end thereof connected in fluid communication to one of the first fluid communication means and the source of the fluid under pressure. The second fluid communication means has an opposed second end thereof being at least in fluid communication with the chamber so as to direct a second portion of the fluid under pressure transversely to a surface of the each fin. In use, the second portion of the supplied fluid under pressure exits through the second end of the second fluid communication means and contacts the surface of the each fin causing rotation of the elongated member.

According to another aspect, the invention provides an apparatus for cleaning air filters. The apparatus includes a body having each of a first end, an opposed second end and an exterior peripheral surface sized and shaped to pass into a center aperture or cavity of the air filter during use of the apparatus. There is a generally closed chamber that is formed within the body along longitudinal axis thereof. An elongated shaft is positioned along the longitudinal axis of the body and passing through the chamber. The elongated shaft has each of a first end thereof mounted for rotation between the first end of the body and the chamber, an opposed second end thereof extending outwardly from the second end of the body and a longitudinal bore formed through the elongated shaft. There is means for rotating the elongated shaft. A fluid communication assembly is secured to the body in fluid communication with the longitudinal bore of the elongated shaft. The fluid communication assembly is connectable to a source of fluid under pressure for supplying the fluid under pressure to each of the longitudinal bore and the means for rotating the elongated shaft. A flange is disposed on the exterior peripheral surface of the body in a plane transverse to the longitudinal axis, the flange having a generally planar first end surface disposed in a plane generally transverse to the longitudinal axis, a frustoconical second end surface and an axial bore disposed along the longitudinal axis when the flange is dispose don the body, the axial bore having a frustoconical peripheral edge sized so as to operatively mate with the exterior peripheral frustoconical surface of the body.

OBJECTS OF THE INVENTION

It is, therefore, one of the primary objects of the present invention to provide a portable apparatus for cleaning air filters which compressed air.

Another object of the present invention is to provide a portable apparatus for cleaning air filters which are used in internal combustion engines on heavy off-road and over the road vehicles.

Yet another object of the present invention is to provide a portable air filter cleaning apparatus which is suitable for use with air filters of different lengths.

A further object of the present invention is to provide a portable air filter cleaning apparatus which is suitable for use with air filters of various diameters.

Yet a further object of the present invention is to provide portable air filter cleaning apparatus which is capable of sealing open ends of the air filter during cleaning process.

An additional object of the present invention is to provide a portable air filter cleaning apparatus which includes a rotating elongated hollow member having a plurality of apertures to direct supplied air pressure to the inner surface of the filtering medium.

Another object of the present invention is to provide a portable air filter cleaning apparatus which includes an elongated hollow member rotatable at a constant speed when used on air filters of variable diameters.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

Reference is now made, to FIGS. 1-18, wherein there is shown a portable apparatus, generally designated as 10, for cleaning an elongated air filter 2 which is generally employed in internal combustion engines on heavy off-road or over the road vehicles which are not shown but well known in the art. Briefly, such air filter 2 has a hollow cylindrical shape characterized by a center cavity 4 when one end of the air filter is closed or by an aperture 4 when both ends are open. A filtering medium 6 is mounted intermediate ends of the air filter 2 and has interior surface 8 and exterior surface 9.

Figure 3:
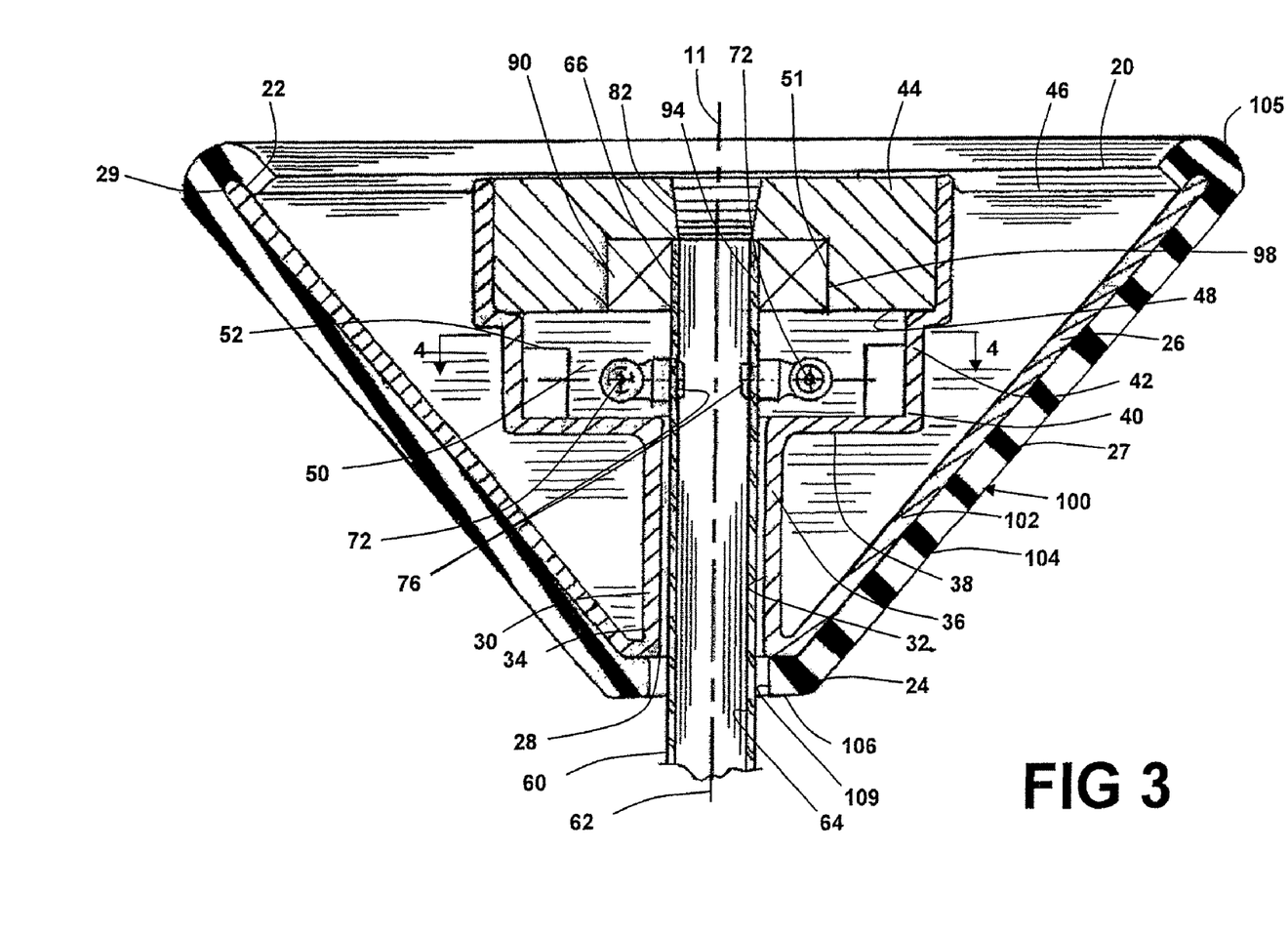
FIG. 3 is a partial cross-sectional view of the portable apparatus of FIG. 1 along lines 3-3 of FIG. 2.

The apparatus 10 includes a body 20, best illustrated in FIG. 3, having a first generally open end 22 and an opposed second end 24 which is positioned adjacent one end of such air filter 2. The presently preferred shape of each end is round. The presently preferred diameter of the first end 22 is about 8.0 inches and the presently preferred diameter of the second end 24 is about 1.0 inch. It is further presently preferred for the body 20 to have a frustoconical wall 26 defining a generally open frustoconical shape of the body 20. The wall 26 has a predetermined thickness which minimizes the weight of the body 20 while providing structural rigidity of the body 20 during use.

The second end 24 has a centrally disposed aperture 28 formed therethrough. An annular boss 30 has a first end 34 thereof disposed on and secured to the inner surface of the second end 24. The annular boss 30 extends along the longitudinal axis 11 of the apparatus 10 toward the first end 22 of the body 20. A radially disposed annular shoulder 38 is secured to and terminates the second end 36 of the annular boss 30. The annular shoulder 38 is adapted with a peripheral flange 40 which is secured thereto and which extends toward the first end 22 of the body 20. A disk like member 44 is disposed on and secured to a terminal edge 42 of the peripheral flange 40. Plurality of optional reinforcement ribs 46 may be employed joining an inner surface of the wall 26 with outer surfaces of each of the annular boss 30, shoulder 38, peripheral flange 40 and disk 44.

Figure 4:
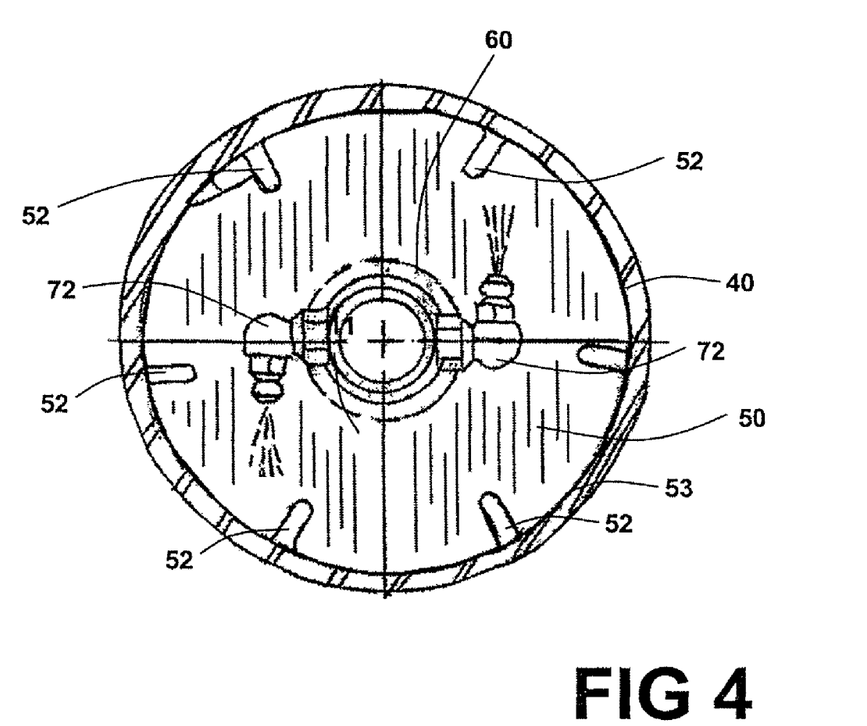
FIG. 4 is a cross-sectional view of the portable apparatus of FIG. 1 along lines 4-4 of FIG. 3, particularly illustrating baffles formed within the air chamber.

For the reasons to be explained later, the bottom surface 48 of the disk 44 and inner surfaces of each of the annular shoulder 38 and the peripheral flange 40 form a generally closed chamber 50 disposed along the longitudinal axis 11, 62. It is important to note that the chamber 50 is disposed stationary relative to the body 20. Plurality of fins or baffles 52 are secured within the chamber 50 along the inner surface of the annular shoulder 48 and the inner surface of the peripheral annular flange 40 each disposed at a predetermined angle relative to a line tangential to such annular flange 40, as best shown in FIG. 4. Such fins or baffles 52 form an irregular inner wall surface 53 of the chamber 50 which is capable of providing resistance to fluid flow within the chamber 50. Alternatively, such irregular inner wall surface 53 may be formed by a plurality of cavities (not shown) formed therein or by a plurality of teeth-like projections (not shown).

Preferably, the body 20, including the chamber 50, is formed as a single piece member from a rigid plastic material by a molding process. Alternatively, the body 20 may be manufactured from a metallic material, for example, such as aluminum.

A fluid dispersing member, such as an elongated shaft 60, is provided and has a longitudinal bore 64 formed therein along a longitudinal axis 62 thereof which is coaxial with the longitudinal axis 11 of the apparatus 10. A first end 66 of the shaft 60 is mounted for rotation between the first end 22 of the body 20 and chamber 50. Accordingly, a cavity 51 is axially formed in the bottom surface 48 of the disk 44 and is sized to operably receive the exterior surface of the first end 66 of the shaft 60. The shaft 60 extends outwardly from the bottom surface 48 of the disk 44, along the longitudinal axis 62 through the chamber 50 and through the inner bore 32 of the annular boss 30. It will be appreciated that the inner bore 32 is sized to allow rotation of the shaft 60. The outer diameter of the elongated shaft 60 is sized for insertion into the center aperture or cavity 4 of such air filter 2.

Pair of nozzles are secured, in open communication with the longitudinal bore 64, to the elongated shaft 60 adjacent to and spaced from the first end 66 so that the nozzles are positioned within the chamber 50 and are free to rotate therewithin upon rotation of the elongated shaft 60. Each nozzle is formed by a conventional L-shape Zerk fitting 72 which has a threaded end thereof received within a threaded aperture 76 being radially formed through the wall 65 of the elongated shaft 60. The outlet end of the fitting 72 is directed generally tangential to the exterior surface of the elongated shaft 60, although other orientations of the fitting 72 are within the scope of the present invention.

Figure 5:
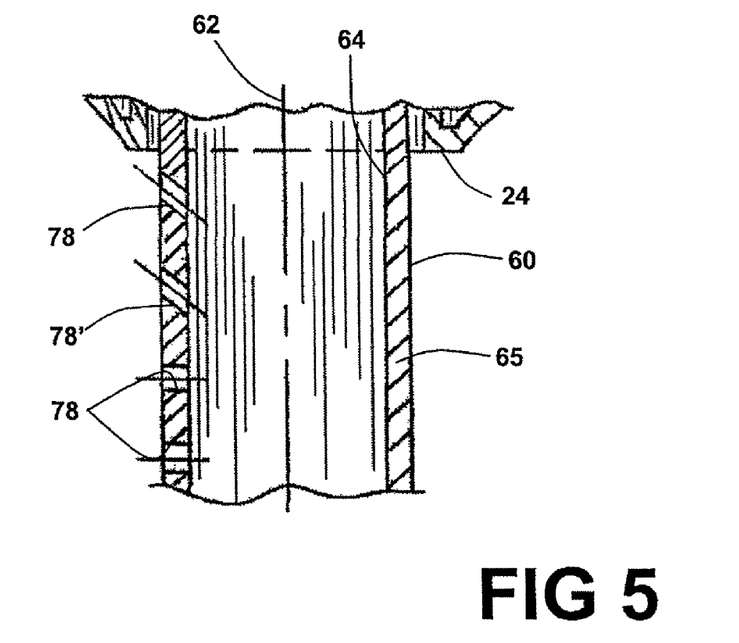
FIG. 5 is a partial cross-sectional view of the portable apparatus along lines 5-5 of FIG. 1, particularly illustrating upwardly angled orifices formed through the wall of the elongated shaft.

Plurality of orifices 78 are radially formed, in a predetermined pattern, through the wall of a portion of the elongated shaft 60 which extends outwardly from the chamber 50. Now, in a particular reference to FIG. 5, at least one orifice 78 which is disposed adjacent the second end 24 of the body 20 and which is referenced, for the sake of clarity, by reference numeral 78' is inclined upwardly at a predetermined angle, as best shown in FIG. 5, for facilitating cleaning the end of the air filter 2 which is engageable with the body 20 being partially inserted into such end of the air filter 2. The diameter of each orifice 78 is predetermined based on the pressure of the supplied fluid so that such fluid exits orifices 78 at a pressure of about 45 pounds per square inch (PSI) which has been found sufficient to adequately clean the filtering medium 6 without inflicting structural damages thereto.

A fluid communication means is secured to the body 20 in fluid communication with the longitudinal bore 64 of the elongated shaft 60 for supplying the fluid under pressure into the longitudinal bore 64. The fluid communication means may be a simple threaded aperture 82 formed in the disk 44 and, preferably, the present invention provides for a male quick release fitting 84 which is threadeably connected to such threaded aperture 82. It will be appreciated that the male quick release fitting 84 is coupled to a female quick release fitting 85 which is typically secured to one end of the hose 86, depicted in FIG. 6.

In operation, the elongated shaft 60 is first inserted into the center aperture or cavity 4 of the air filter 2. The exterior surface 27 of the conical wall 26 of the body 20 is positioned in abutting relationship with the one end of the air filter 2. The frustoconical shape of the wall 26 enables the user of the apparatus 10 to simply and easily center the elongated shaft 60 within the aperture or cavity 4. Fluid, which is preferably air, under pressure enters the longitudinal bore 64 through fluid communication means and exits the longitudinal bore 64 through the plurality of nozzles 72. Upon exiting the nozzles 72, the air flow contacts fins or baffles 52 of the chamber 50, which are angled relative to the direction of air flow, causing resistance to air flow and, more particularly, causing the elongated shaft 60 to rotate in a direction opposite to the air flow from the nozzles 72. Generally at the same time, supplied air under pressure exits the longitudinal bore 64 through the plurality of orifices 78 toward the inner surface 8 of the filtering medium 6 of such air filter 2 causing particulate captured within such filtering medium 6 to exit through the outer surface 9 thereof.

It has been found that a single row of the orifices 78 which are spaced therebetween relative to the longitudinal axis 62 of the elongated shaft 60 is sufficient to clean air filter 2 due to the rotation of the elongated shaft 60. However, it is within the scope of the present invention to provide additional rows of the orifices 78.

The criticality of the chamber 50 is in that it provides for a constant rotational speed of the elongated shaft 60 regardless of the diameter of the inner aperture or cavity 4 of the air filter 2. Thus, air filters 2 of various inner diameters are equally cleaned. It has also been found that such chamber 50 causes vibration of the apparatus 10 and subsequent vibration of the air filter 2 facilitating evacuation of the pollutant impurities from the filtering medium 6.

It is not required, for proper operation of the apparatus 10, for the chamber 50 to be completely sealed and therefore, some air leakage is allowed between the exterior surface of the elongated shaft 60 and surface of the inner bore 32 of the annular boss 30. However, the present invention contemplates that a seal (not shown) may be mounted within the second end 24 of the body 20 or at one end of the annular boss 30 to seal the chamber 50.

Preferably, to accommodate air filters of different length, the elongated shaft 60 is telescoping, so that adjustment can be made during use of the apparatus 10 depending on the length of the air filter 2. It is further presently preferred to close the second end 68 of the elongated shaft 60. Thus, during use, the air pressure that enters the longitudinal bore 64 will force the telescopic portion, having such second end 68 disposed therein, outwardly until the second end 68 reaches the end of the air filter 2.

The telescoping of the elongated shaft 60 includes a securing means, generally designated as 69, for setting a desired length of the elongated shaft 60. It is presently preferred that the securing means 69 for setting the desired length for the telescoping elongated shaft 60 is a friction fit including a spring (not shown) which may be aided with an optional turning movement as is well known in the art for securing telescopic tubular members in the extended or collapsed positions.

Figure 1:
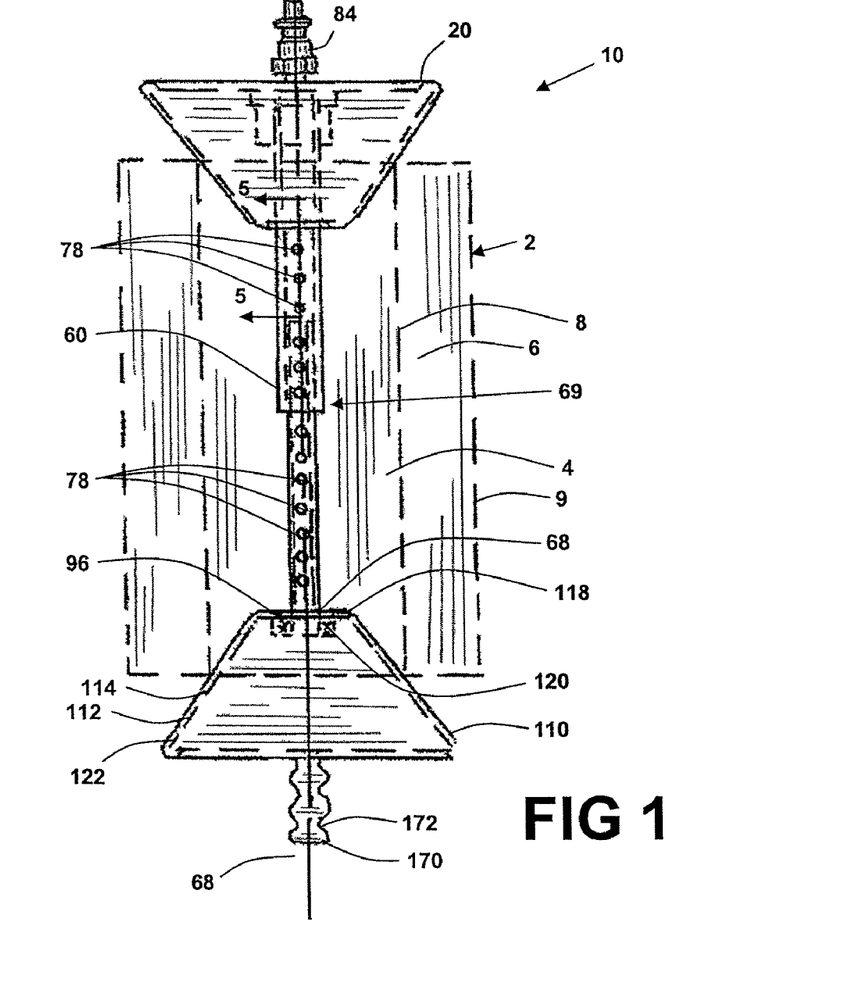
FIG. 1 is an elevation view of a portable apparatus for cleaning air filters of the present invention.
Figure 2:
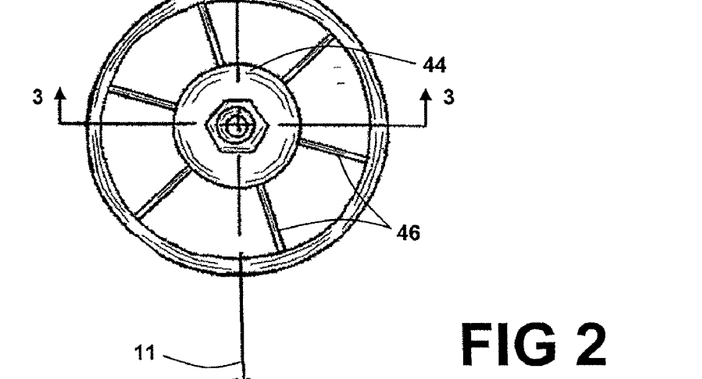
FIG. 2 is a top view of the portable apparatus of FIG. 1.

Although, the elongated shaft 60 is shown in FIG. 1 as having two telescoping portions, the present invention contemplates that any number of telescoping portions may be employed within the elongated shaft 60.

To facilitate rotation of the elongated shaft 60, the present invention provides for a sealed radial bearing 90 which has an outer race 92 thereof operably secured within the cavity 51 which is then sized accordingly and wherein the first end 64 of the elongated shaft 60 is secured to an inner race 94 of the bearing 90. Alternatively to the radial bearing 90, a simple self-lubricating bushing (not shown) manufactured either from a metal or hard polymer may be employed in the present invention.

While the body 20 may be sufficient to close the end of the air filter 2, it is presently preferred to provide a seal 100 which has an inner surface 102 thereof engageable with the exterior surface 27 of the wall 24 of the body 20 and which has an exterior surface 104 thereof engageable with and sealing such one end of such air filter 2. The seal 100 is preferably manufactured from a soft elastomeric material, such as rubber, capable of compressing upon contact with the end of the air filter 2. The bottom end of the seal 100 has a flange 106 which is sized to partially overlap the second end 24 of the body 20 and which has an aperture 109 formed therein to allow passage of the elongated shaft 60. A U-shaped portion 108 terminates the top end of the seal 100 and is sized to hook onto the open edge 29 of the wall 26. Thus, during installation the wall portion of the seal 100 is stretched slightly to enable hooking of the U-shaped portion 108 terminates onto the edge 29 of the wall 26 and, more particularly, enabling secure but yet detachable attachment of the seal 100 onto the body 20. The U-shaped portion 108 is also advantageous in protecting the edge 29 if the body 20 is inadvertently dropped or banged against a rigid structure.

When the air filter 2 has both open ends, it is within the scope of the present invention to provide a seal means 110 for sealing the second end of the air filter 2. By way of an example only of FIG. 1, such seal means 110 may include a frusto-conical member 112 having a wall 114 and an exterior surface 116. A small end 118 of the member 112 is provided with a cavity 120 sized to rotatably receive the second end 68 of the elongated shaft 60. A second seal 122, which is preferably constructed identical to the seal 100, is attached to the frustoconical member 112.

To further facilitate rotation of the elongated shaft 60, a second bearing 96 is operably secured within the cavity 120 of the member 112 and is securely attached to the second end 68 of the elongated shaft 60. However, it is within the scope of the present invention to employ the bearing 96 being securely attached to the second end 68 of the elongated shaft 60 when the air filter 2 has one closed end and when the second seal means 110 is not being used.

Figure 6:
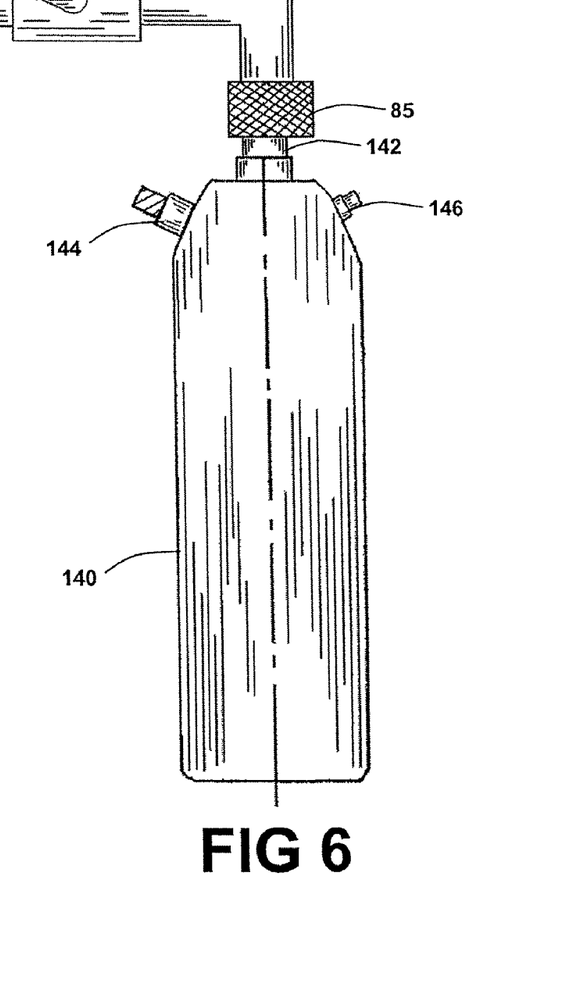
FIG. 6 is an elevation view of an air pressure storage container for use with the portable apparatus for cleaning air filters of FIG. 1.

Now in a particular reference to FIG. 6, the present invention provides an optional portable source of fluid pressure, such as a simple canister 140, which preferably has a male quick release fitting 142 operably secured to its outlet end. Accordingly, the second end of the hose 86 is adapted with a second female quick release fitting 85 for coupling to the male quick release fitting 142.

Furthermore, it is presently preferred to adapt the canister 140 with a well known tire stem valve 144 for simply and conveniently refilling or recharging an empty canister 140. Furthermore, a safety valve 146 is then provided for limiting the air pressure stored in the portable canister 140 during refilling effort to about 200 PSI. A manually operated shut-off valve 150 is positioned in the air supply stream intermediate the ends of the hose 86 for selectively supplying air pressure from the canister 140 to the apparatus 10. The size of the canister 140 is preselected to enable consecutive cleaning of the air filter 2 between recharging while enabling convenient storage of the canister 140 in tight quarters. It has been determined that the canister having diameter of about 2.5 inches and length of about 10 inches is sufficient to clean most air filters 2 three to four times prior to being in need of recharge. Thus the user of the apparatus 10 can simply and easily store the apparatus 10 and the canister 140 within the vehicle and use it at a predetermined intervals, for example when filling such vehicle with gasoline.

Although the present invention has been shown in terms of the body 20 constructed as a single piece member with the disk 44 rigidly secured thereto, it will be apparent to those skilled in the art, that the disk 44 may be adapted for detachable attachment within the body 20 in a snap-fit manner. Such detachable attachment may be advantageous for minimizing space envelope during shipping and storage as well as for maintaining the nozzles 72 and bearing 90.

It may be further advantageous to provide at least one handle member 160 for facilitating handling of the apparatus 10 during use. Now in particular reference to FIG. 7, such handle member 160 is illustrated as being secured to the disk 44 and is preferably formed integral therewith. The depicted handle member 160 has an elongated shape and is provided with a conventional grip portion 162. An aperture 166 is axially formed therethrough for mating with the bore 64 of the elongated shaft 60. A free end of the handle member 160 is updated for receiving the male fitting 84.

Figure 7:
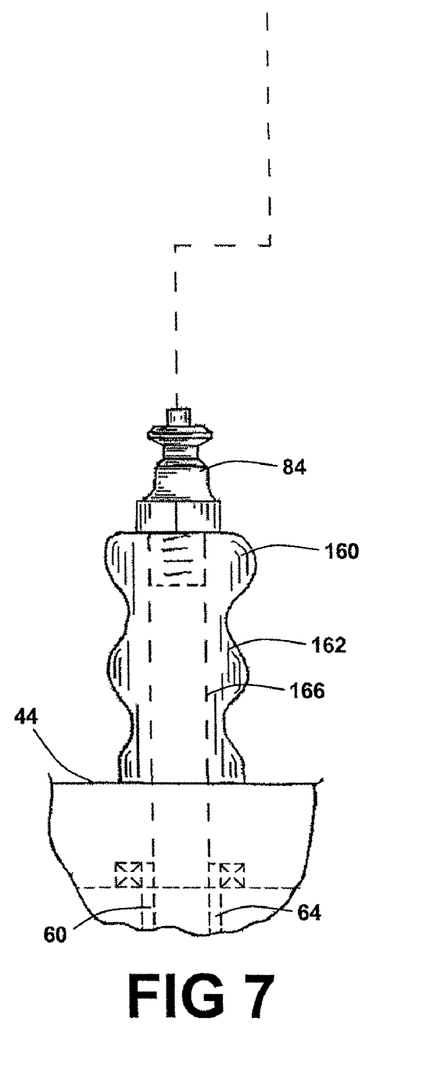
FIG. 7 is a partial elevation view of the portable apparatus of FIG. 1, particularly illustrating optional handle member.
Figure 8:
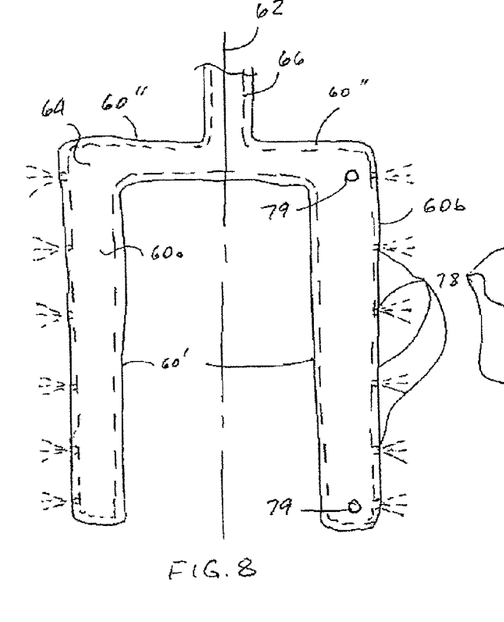
FIG. 8 is a partial elevation view of the portable apparatus of FIG. 1, particularly illustrating one form of the elongated shaft.

A second handle member 170 may be secured to the member 112 and provided with the grip portion 172.

Additionally, it is within the scope of the instant invention to replace the male quick release fitting 84 with a tire stem valve 144 enabling simple connection of the apparatus 10 to the tire filling system found at most gas and service stations.

Figure 11:
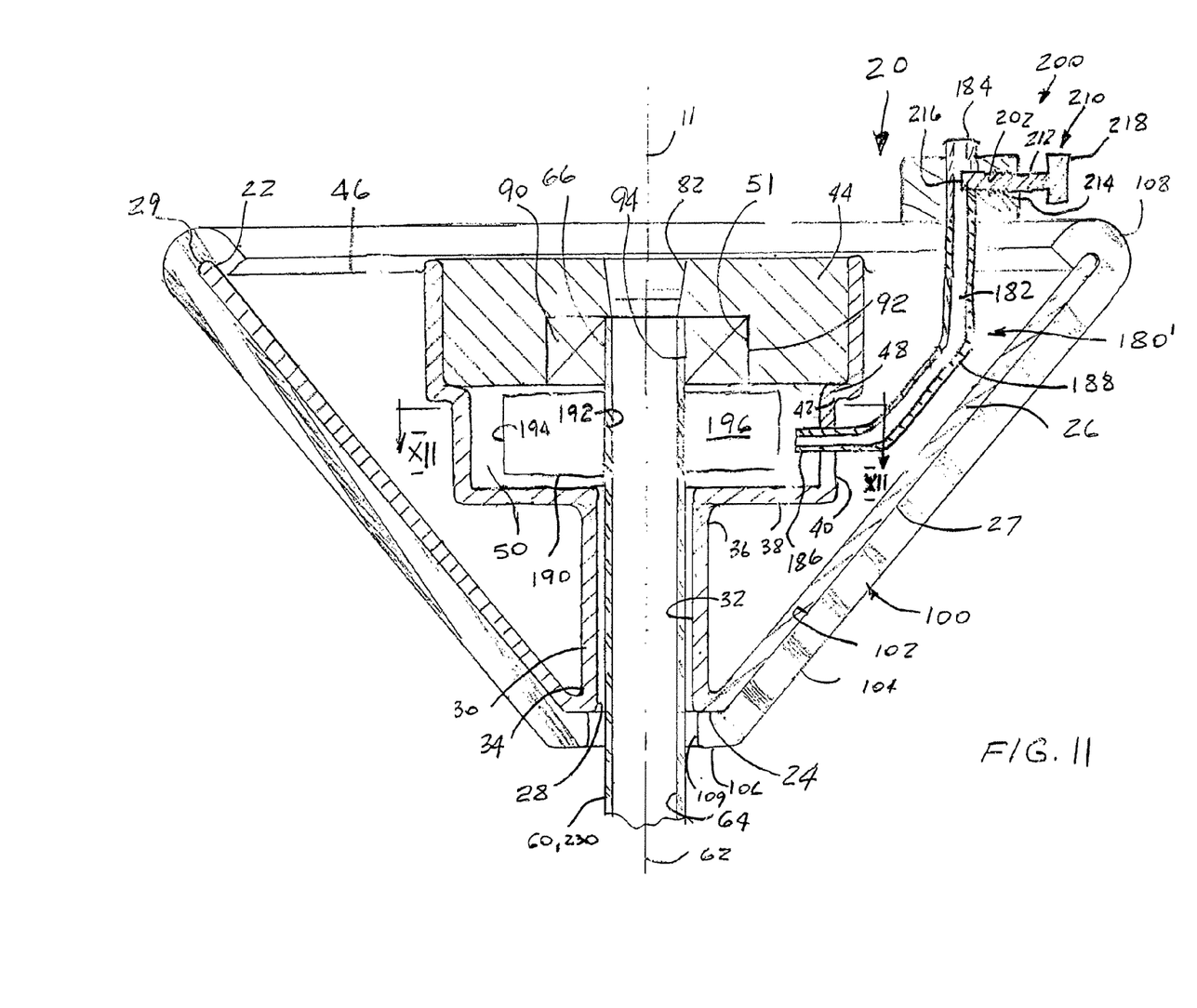
FIG. 11 is an elevation view of a portable apparatus for cleaning air filters constructed in accordance with another embodiment of the invention.
Figure 12:
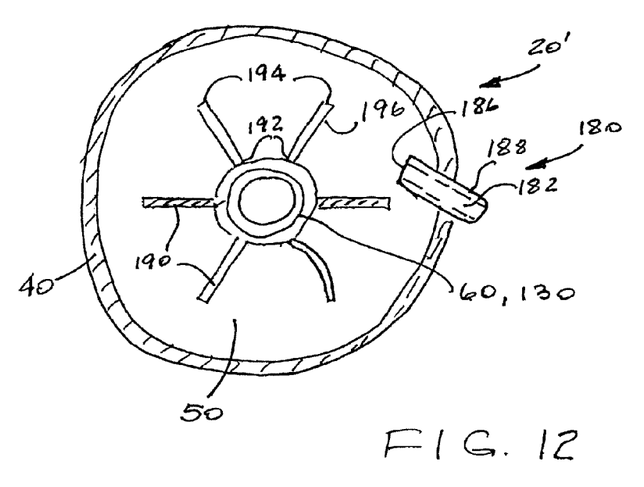
FIG. 12 is a partial cross-sectional view of the portable apparatus along lines XII-XII of FIG. 11.

Now in a particular reference to FIGS. 11-12, therein is shown a body 20' which is constructed essentially identical to the above described body 20. The body 20' further includes means for rotating the elongated shaft 60 and includes a second fluid communication means, generally designated as 180, disposed therewithin and having a first end 184 thereof connected in fluid communication to either the quick release fitting 84', being adapted with a pair of output orifices or the source of the fluid under pressure. The second fluid communication means 180 also has an opposed second end 186 thereof being at least disposed in fluid communication with the chamber 50

There is also a plurality of fins or blades 190 disposed within the chamber 50 and radially spaced apart about the longitudinal axis 11, 62. Each of the plurality of fins 190 has a first edge 192 thereof secured on an exterior surface of the elongated shaft 60 and has an opposed second edge 194 thereof aligned generally parallel to the longitudinal axis 62. Furthermore, the second end 186 of the second fluid communication means 180 is disposed so as to direct a second portion of the fluid under pressure generally transversely to a surface 196 of each fin 190, whereby the second portion of the supplied fluid under pressure exits through the second end 186 of the second fluid communication means 180 and contacts the surface 196 of the each fin 190 causing rotation of the elongated shaft 60. Although, the surface 196 is shown as a generally planar surface it may have a curved shape.

By way of an example only of FIGS. 11-12, the second fluid communication means 180 is shown and described as a passageway 182 having such first and second ends 184, 186 respectively. Particularly, when the first end 22 of the body 20, 20' is generally open, the passageway 182 is provided as a tubular member 188 bent so as to operatively position the second end 186. The second end 186 may further extend into the chamber 50.

Figure 13:
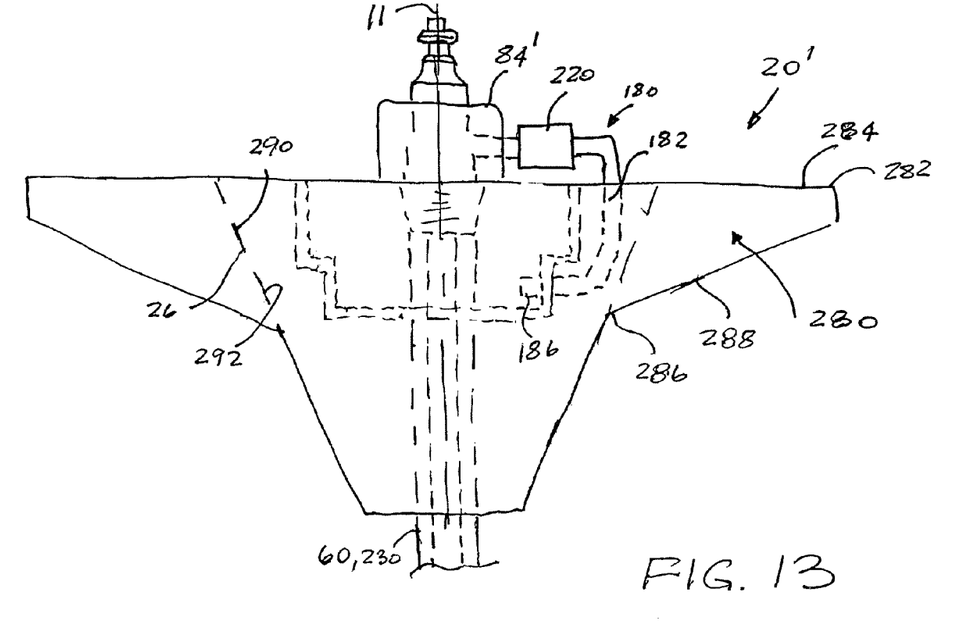
FIG. 13 is another elevation view of the portable apparatus of FIG. 11.
Figures 14, 16:
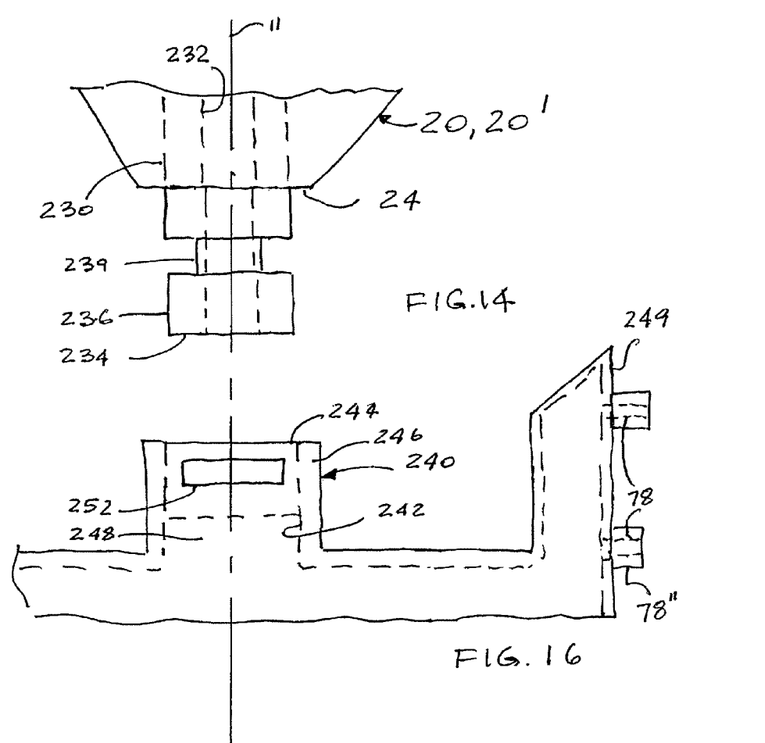
FIG. 14 is an enlarged partial elevation view of the portable apparatus of FIG. 13.
FIG. 16 is a partial elevation view of the portable apparatus of FIG. 13, particularly illustrating one form of the fluid dispersing member.
Figure 15:
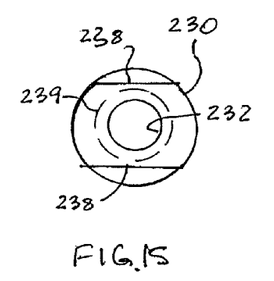
FIG. 15 is a bottom planar view of the portable apparatus of FIG. 14.
Figure 17:
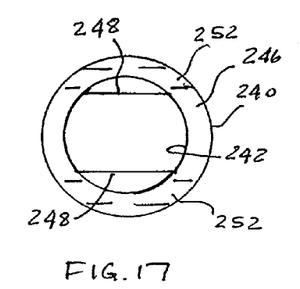
FIG. 17 is a top planar view of the portable apparatus of FIG. 16.

Now in reference to FIG. 13, it is also contemplated to provide means, generally designated as 200, for varying flow and/or pressure of the second portion of the fluid through the passageway 182 and, thus varying the rotational speed of the shaft 60. In accordance with one embodiment of FIG. 11, such means 200 includes a threaded aperture 202 provided in the body 20' and a fitting 210 operatively received within the aperture 202. The fitting 210 has an elongated body 212 with an external thread 214 threadeably and operatively engaging threaded aperture 202. The threaded aperture 202 is disposed in open communication with the passageway 182 so that a distal end 216 of the threaded fitting 210 is selectively advanced, in a linear direction, into the passageway 182 and is withdrawn therefrom when the user rotates the body 212 at the proximal end 218 of the fitting 210 that is preferably provided with a knob or any other suitable griping means facilitating rotation of the fitting 210. It would be appreciated that the threaded engagement of the fitting 210 with the threaded aperture 202 is preferably provided in a manner substantially eliminating leakage from the passageway 182 and may further include sealing members (not shown).

The means 200 may be also provided as a conventional metering valve 220 mounted external to the first end 22 of the body 20', for example adjacent to the fitting 84', as best shown in FIG. 13.

Figure 9:
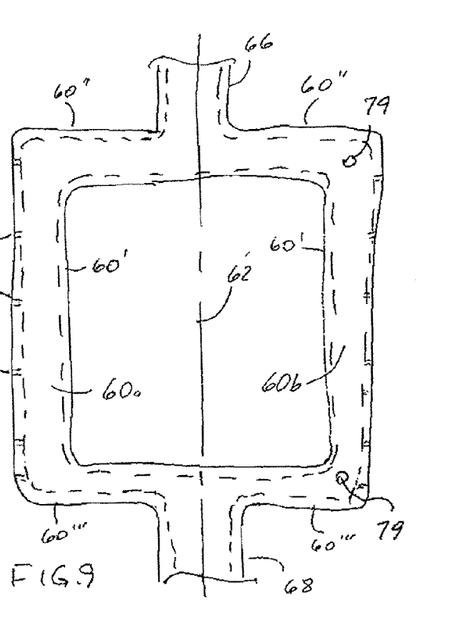
FIG. 9 is a partial elevation view of the portable apparatus of FIG. 1, particularly illustrating another form of the elongated shaft.
Figure 10:
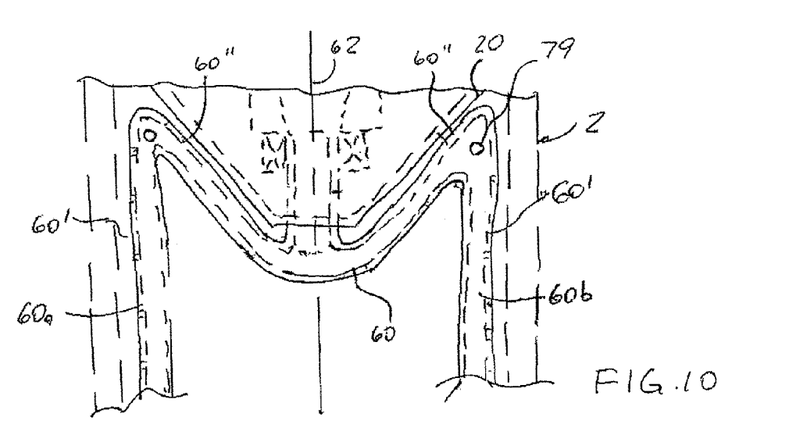
FIG. 10 is a partial elevation view of the portable apparatus of FIG. 1, particularly illustrating yet another form of the elongated shaft.

It is also within the scope of the present invention that in order to accommodate air filters of larger diameters, as well as applications requiring outmost degree of cleanness, the portion of the elongated shaft 60 extending outwardly from the chamber 50 and disposed between ends 66, 68 may be provided in various shapes. By way of an example of FIG. 8, such portion may be provided as a pair of generally L-shaped branches 60a, 60b each having a first leg 60' thereof disposed substantially parallel to one another and substantially parallel to the longitudinal axis 62. The first leg 60' is positioned in close proximity to the interior surface 8 of the air filter 2. The second leg 60" of each branch 60a, 60b is connected to the first end 66 of the elongated shaft 60 thus forming a generally U-shape thereof. The internal bore 64 is then formed through both legs 60', 60" and an end of the second leg 60" is open for fluid communication with such first end 66. Consequently, the orifices 78 are formed in at least each first leg 60' of each branch 60a, 60b and may be also formed in the second leg 60". When the seal means 110 is employed and receives the second end 68 of the elongated shaft 60, an opposed end of each branch 60a, 60b is also open and bent inwardly, by way of a third leg 60''', for connection to the second end 68 of the elongated shaft 60, as best shown in FIG. 9. It is also contemplated to dispose at least one leg of each branch 60a, 60b at an angle with respect to the longitudinal axis 62 of the elongated shaft 60 so that it can be positioned in close proximity to the surface of the member 20, 112, as best shown in FIG. 10. In either configuration of FIGS. 8-10, additional air vents 79 may be formed through the wall of at least one branch 60a, 60b and oriented substantially perpendicular to the orifices 78 for aiding the nozzles in rotation of the elongated shaft 60.

Now in reference to FIGS. 14-18, it is also contemplated to detachably attach the fluid dispersing portion of the elongated shaft 60 to the body 20, 20'. The instant invention achieves this by terminating the shaft 60 external to the second end 24 of the body 20, 20' and in proximity thereto. Essentially, the original portion of the shaft 60 starting at the first end 66 and terminating in proximity to the second end 22 is provided as a simple elongated member 230 having a longitudinal internal bore 232 (which is generally identical to the longitudinal bore 64) and an end 234 extending outwardly from the second end 22 of the body 20, 20'. Then, the remaining portion of the shaft 60 having at least one orifice 78, 78' is provided as a separate fluid dispersing member 240 having a hollow interior or bore 242. The fluid dispersing member 240 may be provided as a generally straight member of FIG. 1, shaped member of FIGS. 8-10 or any combinations thereof. Preferably, a portion of the fluid dispersing member 240, referenced with numeral 249 in FIG. 16, extends beyond the end 244 of the fluid dispersing member 240 and is tapered so as to operatively fit about the frustoconical peripheral surface 26 of the body 20, 20' in order to improve cleaning of the end portion of the filter abutting such frustoconical peripheral surface 26.

The apparatus 10 then includes means, generally designated as 250, for releaseably coupling one end 244 of the fluid dispersing member 240 in fluid communication to the end 234 of the elongated member 230. By way of an example only of FIGS. 14-18, such means 250 includes an end portion 236 of the elongated member 230 carrying the end 234 thereof and having a pair generally flat surfaces 238 disposed adjacent to the pair of elongated slots 252 and diametrically opposing each other. There is also another portion 239 of the elongated member 230 being disposed above the end portion 236 and having a diameter which is smaller than a diameter of the elongated member 130. Then, a pair of diametrically opposed slots 252 are formed through a wall 246 of the end 244 of the fluid dispersing member 240 in a plane transverse to the longitudinal axis 11 of the elongated member 230. A retaining member, such as generally U-shaped clip 260, is provided and is manufactured from a resilient material. The clip 260 has a first concave edge portion 266 disposed on an interior edge 264 of one leg 262 and a second concave edge portion 274 disposed on an interior edge 272 of an opposed leg 270 in operative alignment with the first concave edge portion 266. The first and second concave edge portions 266 and 274 are sized so as to abutingly mate with a peripheral surface of the portion 239 of the elongated member 230. Further, the end 244 of the fluid dispersing member 240 is being sized and shaped so as to operatively receive the end portion 236 of the elongated member 230 therewithin. Accordingly, the interior of the end 244 is provided with a pair of complimentary flat surfaces 248.

Thus, when the end portion 236 is inserted into the end 244 with the flat surfaces 238 and 248 abutingly mating with each other, and the clip 260 is inserted through the slots 252, which are advantageously positioned above the end portion 234, the fluid dispersing member 240 is detachably coupled to the elongated member 230 and is fixed for rotation therewith.

Although the above described attachment of the fluid dispersing member 240 to the elongated member 230 has been found advantageous to quickly change fluid dispersing members 240, other semi-permanent connections, for example such as threaded connection, connection based on use of quarter turn fasteners and the like is also contemplated.

Figure 18:
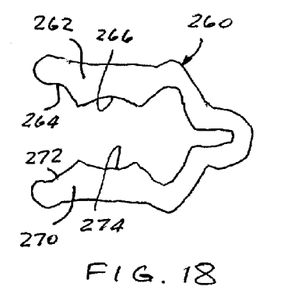
FIG. 18 is a planar view of a retaining member employed for detachable attachment of the fluid dispersing member of FIGS. 16-17 to an end of an elongated member of FIGS. 14-15.

Now in further reference to FIG. 18, when it is further required to accommodate air filters 2 of larger diameters, a flange 280 is provided and has a first end 282 preferably having a substantially smooth and planar surface 284 disposed in a plane generally transverse to the longitudinal axis 11 and an opposed second end 286 having a peripheral frustoconical and generally smooth surface 288 for engagement with the end of the air filter 2. The flange 280 may be provided integral to the body 20, 20' as a one-piece structure or the flange 280 may be provided as a disk shaped member, further having a central or axial bore 290 having a frustoconical peripheral edge 292 sized so as to operatively mate with the exterior peripheral surface of the frustoconical wall 26 of the body 20, 20' or the exterior surface 104 of the seal 100. In use, the peripheral frustoconical surface 288 is positioned to abut the edge of the air filter 2.

When the fluid dispersing members 60, 240 are manufactured by molding from plastic material so as to reduce weight and cost of the apparatus 10, the exterior surface thereof may be adapted with a plurality of abutments 78" positioned at each orifice 78 which is then is extended therethrough so as to improve rigidity of the fluid dispersing members 60, 240 and further aid molding process. It will be further apparent to those skilled in the relevant art, that other shapes, for example such as spherical dome, of the seals 110, 122 and respective shapes of the body 20, 20' and the member 112 may be applied in the instant invention for sealing a respective end of the air filter 2.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

I claim:

1. An apparatus comprising:
   (a) a body having each of a first end, an opposed second end and an exterior peripheral surface;
   (b) a generally closed chamber formed within said body along longitudinal axis thereof;
   (c) an elongated member positioned along said longitudinal axis of said body and passing through said chamber, said elongated member having each of a first end thereof mounted for rotation between said first end of said body and said chamber, an opposed second end thereof extending outwardly from said second end of said body and a longitudinal bore formed through said elongated member;
   (d) a plurality of fins disposed within said chamber and radially spaced apart about said longitudinal axis, each of said plurality of fins having a first edge thereof secured on an exterior surface of said elongated member and having an opposed second edge thereof aligned generally parallel with said longitudinal axis, so that plurality of fins rotate with said elongated member;
   (e) a first fluid communication means secured to said first end of said body in fluid communication with said longitudinal bore of said elongated member, said first fluid communication means is connectable to a source of fluid under pressure for supplying a first portion of the fluid under pressure into said longitudinal bore;
   (f) a second fluid communication means disposed within said body and having a first end thereof connected in fluid communication to one of said first fluid communication means and the source of the fluid under pressure, said second fluid communication means having an opposed second end thereof being at least in fluid communication with said chamber so as to direct a second portion of the fluid under pressure transversely to a surface of said each fin; and
   (g) whereby the second portion of the supplied fluid under pressure exits through said second end of said second fluid communication means and contacts said surface of said each fin causing rotation of said elongated member.

2. The apparatus, according to claim 1, wherein said second fluid communication means includes a passageway provided within said body.

3. The apparatus, according to claim 2, wherein said passageway is provided as a tubular member.

4. The apparatus, according to claim 3, wherein said tubular member extends into said chamber.

5. The apparatus, according to claim 2, wherein said second fluid communication means further includes means for varying flow of the second portion of the fluid through said passageway.

6. The apparatus, according to claim 5, wherein said means for varying flow of the second portion of the fluid through said passageway includes a threaded aperture provided in said body and a threaded fitting operatively received within said threaded aperture, said threaded aperture having a first end thereof disposed in open communication with said first end of said body and an opposed second end thereof disposed in open communication with said passageway so that a distal end of said threaded fitting is selectively advanced into said passageway and is withdrawn therefrom.

7. The apparatus, according to claim 5, wherein said means for varying flow of the second portion of the fluid through said passageway includes a metering valve.

8. The apparatus of claim 1 further including a disk shaped member disposed in a plane generally transverse to said longitudinal axis and having a generally planar first end surface, a frustoconical second end surface and an axial bore, said axial bore having a frustoconical peripheral edge sized so as to operatively mate with said exterior peripheral frustoconical surface of said body.

9. The apparatus, according to claim 1, wherein said second end of said elongated member has each of an end portion carrying said second end thereof, a pair of diametrically opposed generally flat surfaces disposed on said end portion and another portion disposed above said end portion, said another portion having a diameter which is smaller than a diameter of said elongated member.

10. The apparatus of claim 1 further including a fluid dispersing member having a hollow interior and at least one orifice formed through a wall thereof.

11. The apparatus of claim 10 further including means for releaseably coupling one end of said fluid dispersing member in fluid communication to said second end of said elongated member.

12. The apparatus, according to claim 11, wherein said means for releaseably coupling one end of said fluid dispersing member in fluid communication to said second end of said elongated member includes:
   (a) an end portion of said elongated member carrying said second end thereof and having a pair of diametrically opposed generally flat surfaces;
   (b) another portion of said elongated member disposed next to said end portion, said another portion having a diameter which is smaller than a diameter of said end portion;
   (c) a pair of diametrically opposed elongated slots formed through a wall of said fluid dispersing member in a plane transverse to said longitudinal axis of said elongated member;
   (d) a retaining member sized and shaped for insertion into said pair of elongated slots and engagement with a peripheral surface of said another portion; and
   (e) said one end of said fluid dispersing member being sized so as to receive said end portion of said elongated member therewithin.

13. The apparatus of claim 12, wherein said one end of said fluid dispersing member includes a pair of complimentary flat surfaces disposed adjacent to said pair of elongated slots and diametrically opposing each other.

14. The apparatus of claim 12, wherein said retaining member is a generally U-shaped clip having a first concave edge portion disposed on an interior edge of one leg and a second concave edge portion disposed on an interior edge of an opposed leg in operative alignment with said first concave edge portion, said first and second concave edge portions sized so as to abutingly mate with said peripheral surface of said another portion of said elongated member, said clip manufactured from a generally resilient material so as to allow the first and second legs to spread during insertion into and removal from said pair of elongated slots and further allow said first and second legs to return into original position.

15. An apparatus comprising:
   (a) a body having each of a first end, an opposed second end and an exterior peripheral surface sized and shaped to pass into a center aperture or cavity of the air filter during use of said apparatus;
   (b) a generally closed chamber formed within said body along longitudinal axis thereof;
   (c) an elongated shaft positioned along said longitudinal axis of said body and passing through said chamber, said elongated shaft having each of a first end thereof mounted for rotation between said first end of said body and said chamber, an opposed second end thereof extending outwardly from said second end of said body and a longitudinal bore formed through said elongated shaft;
   (d) means for rotating said elongated shaft;
   (e) a fluid communication assembly secured to said body in fluid communication with said longitudinal bore of said elongated shaft, said fluid communication assembly is connectable to a source of fluid under pressure for supplying said fluid under pressure to each of said longitudinal bore and said means for rotating said elongated shaft; and
   (f) a flange disposed on said exterior peripheral surface of said body in a plane transverse to said longitudinal axis, said flange having a generally planar first end surface disposed in a plane generally transverse to said longitudinal axis, a frustoconical second end surface and an axial bore disposed along said longitudinal axis when said flange is dispose don said body, said axial bore having a frustoconical peripheral edge sized so as to operatively mate with said exterior peripheral frustoconical surface of said body.

16. The apparatus, according to claim 15, wherein said flange is provided integral with said body as a one-piece construction.

17. The apparatus of claim 15 further including a seal having an inner surface thereof sized to fit said exterior surface of said body and an opposed outer surface thereof engaging and sealing the one end of the air filter.

18. The apparatus of claim 15 further including said source of said fluid under pressure and means for connecting said source to said fluid communication assembly.

19. In an apparatus for cleaning air filter, said apparatus including an elongated hollow member mounted for rotation within said annular air filter and connected at one end thereof to a supply of fluid pressure and a plurality of orifices formed through a wall of said elongated hollow member for directing said air pressure toward an inner surface of said air filter, an arrangement for rotating said elongated member comprising:
   (a) a generally closed chamber encasing a portion of said elongated hollow member;
   (b) a plurality of fins or blades disposed within said chamber and radially spaced apart about said longitudinal axis, each of said plurality of fins or blades having a first edge thereof secured on an exterior surface of said hollow elongated member and having an opposed second edge thereof aligned generally parallel with said longitudinal axis, so that plurality of fins rotate with said elongated member; and
   (c) means for directing a portion of said supply of fluid pressure onto a surface of said each fin or blade.

* * * * *